(12) United States Patent
Blum et al.

(10) Patent No.: US 7,358,861 B2
(45) Date of Patent: Apr. 15, 2008

(54) ELECTRONIC FLOOR DISPLAY WITH ALERTING

(75) Inventors: Ronald D. Blum, Roanoke, VA (US); William Kokonaski, Gig Harbor, WA (US); Jack Loeb, Jr., Roanoke, VA (US)

(73) Assignee: Intellimats, Roanoke, VA (US)

( * ) Notice: Subject to any disclaimer, the term of this patent is extended or adjusted under 35 U.S.C. 154(b) by 0 days.

(21) Appl. No.: 11/199,130

(22) Filed: Aug. 9, 2005

(65) Prior Publication Data

US 2006/0044149 A1 Mar. 2, 2006

Related U.S. Application Data

(63) Continuation-in-part of application No. 10/759,167, filed on Jan. 20, 2004, now Pat. No. 7,205,903, and a continuation-in-part of application No. 11/002,276, filed on Dec. 3, 2004, now Pat. No. 7,145,469, and a continuation-in-part of application No. 10/682,435, filed on Oct. 10, 2003, now Pat. No. 6,917,301, and a continuation-in-part of application No. 10/454,631, filed on Jun. 5, 2003, now Pat. No. 7,009,523, and a continuation-in-part of application No. 10/438,923, filed on May 16, 2003, now Pat. No. 6,982,649, which is a continuation of application No. 10/137,357, filed on May 3, 2002, now Pat. No. 6,507,285, and a continuation-in-part of application No. 10/285,639, filed on Nov. 1, 2002, now Pat. No. 6,873,266, which is a continuation of application No. 09/767,846, filed on Jan. 24, 2001, now Pat. No. 6,417,778, which is a continuation of application No. 09/418,752, filed on Oct. 15, 1999, now abandoned, which is a continuation of application No. 09/304,051, filed on May 4, 1999, now Pat. No. 6,219,876.

(60) Provisional application No. 60/599,878, filed on Aug. 10, 2004, provisional application No. 60/441,408, filed on Jan. 22, 2003, provisional application No. 60/526,271, filed on Dec. 3, 2003, provisional application No. 60/429,044, filed on Nov. 23, 2002, provisional application No. 60/428,387, filed on Nov. 21, 2002, provisional application No. 60/418,626, filed on Oct. 12, 2002, provisional application No. 60/385,579, filed on Jun. 5, 2002, provisional application No. 60/378,070, filed on May 16, 2002.

(51) Int. Cl.
*G08B 5/00* (2006.01)

(52) U.S. Cl. ............... 340/815.4; 340/332; 340/407.1; 340/555; 340/666; 340/691.6; 340/693.5

(58) Field of Classification Search ............ 340/815.4, 340/407.1, 555, 666, 691.1, 691.6, 693.5, 340/541, 815.45, 573.1, 691.2, 691.4, 691.5, 340/331, 332
See application file for complete search history.

(56) References Cited

U.S. PATENT DOCUMENTS 2,191,704 A 2/1940 Bennett (Continued)

FOREIGN PATENT DOCUMENTS

CA 2169111 8/1997

(Continued)

OTHER PUBLICATIONS

Related U.S. co-pending U.S. Appl. No. 10/438,923, filed May 16, 2003.

(Continued)

*Primary Examiner*—Thomas Mullen
(74) *Attorney, Agent, or Firm*—Alston & Bird LLP

(57) ABSTRACT

Embodiments of the present invention relate to an electronic floor display system with an alerting feature to encourage persons standing near or on the floor display system to look down and observe its display.

23 Claims, 2 Drawing Sheets

U.S. PATENT DOCUMENTS

| | | |
|---|---|---|
| 2,254,830 A | 9/1941 | Schloss |
| 2,276,104 A | 3/1942 | Shaunessey |
| 2,282,672 A | 5/1942 | Nelson |
| 2,512,310 A | 6/1950 | Corson |
| 2,791,852 A | 5/1957 | Laskow |
| 2,800,215 A | 7/1957 | Bennett |
| 2,843,868 A | 7/1958 | Borgstorm |
| 2,919,456 A | 1/1960 | Spivey |
| 3,078,490 A | 2/1963 | Etcher |
| 3,083,393 A | 4/1963 | Nappi |
| 3,141,522 A | 7/1964 | Fitzpatrick |
| 3,183,116 A | 5/1965 | Schaar |
| 3,300,275 A | 1/1967 | Lorman |
| 3,400,421 A | 9/1968 | Nappi et al. |
| 3,435,481 A | 4/1969 | Kessler |
| 3,501,797 A | 3/1970 | Nappi |
| 3,517,407 A | 6/1970 | Wyant |
| 3,578,738 A | 5/1971 | Hughes |
| 3,663,980 A | 5/1972 | Conklin |
| 3,665,543 A | 5/1972 | Nappi |
| 3,696,459 A | 10/1972 | Kucera et al. |
| 3,699,926 A | 10/1972 | Stockl |
| 3,717,897 A | 2/1973 | Amos et al. |
| 3,785,102 A | 1/1974 | Amos |
| 3,886,620 A | 6/1975 | Miller et al. |
| 3,906,578 A | 9/1975 | Huber |
| 3,909,996 A | 10/1975 | Ettinger, Jr. et al. |
| 3,916,401 A | 10/1975 | Freeman |
| 3,930,084 A | 12/1975 | Shields |
| 4,107,811 A | 8/1978 | Imsande |
| 4,126,854 A | 11/1978 | Sheridon |
| 4,143,103 A | 3/1979 | Sheridon |
| 4,143,194 A | 3/1979 | Wihksne |
| 4,328,275 A | 5/1982 | Vargo |
| 4,353,944 A | 10/1982 | Tarui |
| 4,421,809 A | 12/1983 | Bish et al. |
| 4,435,451 A | 3/1984 | Neubert |
| 4,439,474 A | 3/1984 | Sagel |
| 4,482,593 A | 11/1984 | Sagel et al. |
| 4,484,250 A | 11/1984 | Rzepecki et al. |
| 4,559,250 A | 12/1985 | Paige |
| 4,564,546 A | 1/1986 | Jones |
| 4,567,481 A | 1/1986 | Meier et al. |
| 4,576,244 A | 3/1986 | Zeigner et al. |
| 4,609,580 A | 9/1986 | Rockett et al. |
| 4,614,679 A | 9/1986 | Farrington et al. |
| 4,660,828 A | 4/1987 | Weiss |
| 4,665,342 A | 5/1987 | Topp et al. |
| 4,707,895 A | 11/1987 | Lang |
| 4,720,789 A | 1/1988 | Hector et al. |
| 4,752,114 A | 6/1988 | French |
| 4,773,492 A | 9/1988 | Ruzumna |
| 4,798,754 A | 1/1989 | Tomek |
| 4,822,669 A | 4/1989 | Roga |
| 4,831,242 A | 5/1989 | Englehardt et al. |
| 4,853,678 A | 8/1989 | Bishop, Jr. et al. |
| 4,876,969 A | 10/1989 | Infanti |
| 4,917,975 A | 4/1990 | De Guzman |
| 4,959,265 A | 9/1990 | Wood |
| 4,974,857 A | 12/1990 | Beall et al. |
| 5,018,235 A | 5/1991 | Stamatiou |
| 5,071,628 A | 12/1991 | Alazet |
| 5,117,221 A | 5/1992 | Mishica, Jr. |
| 5,142,733 A | 9/1992 | Mogez |
| 5,161,041 A | 11/1992 | Abileah et al. |
| 5,168,423 A | 12/1992 | Ohgami et al. |
| 5,185,948 A | 2/1993 | Markson |
| 5,204,159 A | 4/1993 | Tan |
| 5,210,528 A | 5/1993 | Schulman et al. |
| 5,268,816 A | 12/1993 | Abell et al. |
| 5,293,660 A | 3/1994 | Park |
| 5,297,353 A | 3/1994 | Ghalayini |
| 5,305,197 A | 4/1994 | Axler et al. |
| 5,335,788 A | 8/1994 | Beasley et al. |
| 5,344,693 A | 9/1994 | Sanders |
| 5,460,381 A | 10/1995 | Smith et al. |
| 5,461,748 A | 10/1995 | Koiduka |
| 5,483,049 A | 1/1996 | Schulze, Jr. |
| 5,500,267 A | 3/1996 | Canning |
| 5,534,917 A | 7/1996 | MacDougall |
| 5,556,685 A | 9/1996 | Swicegood, Jr. |
| 5,561,446 A | 10/1996 | Montlick |
| 5,562,580 A | 10/1996 | Beasley et al. |
| 5,571,626 A | 11/1996 | Cumming et al. |
| 5,575,294 A | 11/1996 | Perry |
| 5,589,246 A | 12/1996 | Calhoun |
| 5,604,027 A | 2/1997 | Sheridon |
| 5,613,313 A | 3/1997 | Homan et al. |
| 5,620,003 A | 4/1997 | Sepponen |
| 5,646,818 A | 7/1997 | Hahn |
| 5,658,637 A | 8/1997 | Volz |
| 5,703,564 A | 12/1997 | Begum et al. |
| 5,723,204 A | 3/1998 | Stefik |
| 5,747,133 A | 5/1998 | Vinod et al. |
| 5,775,993 A | 7/1998 | Fentz et al. |
| 5,805,117 A | 9/1998 | Mazurek et al. |
| 5,815,995 A | 10/1998 | Adams |
| 5,816,550 A | 10/1998 | Watanabe et al. |
| 5,826,874 A | 10/1998 | Teitell et al. |
| 5,839,976 A | 11/1998 | Darr |
| 5,848,830 A | 12/1998 | Castle et al. |
| 5,869,350 A | 2/1999 | Heeger et al. |
| 5,885,684 A | 3/1999 | Hefner et al. |
| 5,886,474 A | 3/1999 | Asai et al. |
| 5,913,727 A | 6/1999 | Ahdoot |
| 5,945,502 A | 8/1999 | Hsieh et al. |
| 5,954,592 A | 9/1999 | Laffer |
| 5,966,696 A | 10/1999 | Giraud |
| 5,971,761 A | 10/1999 | Tillman, Sr. |
| 6,001,456 A | 12/1999 | Newland |
| 6,010,429 A | 1/2000 | Prueitt |
| 6,038,465 A | 3/2000 | Melton, Jr. |
| 6,067,080 A | 5/2000 | Holtzman |
| 6,084,526 A | 7/2000 | Blotky et al. |
| 6,128,186 A | 10/2000 | Feierbach |
| 6,179,710 B1 | 1/2001 | Sawyer et al. |
| 6,219,876 B1 | 4/2001 | Blum |
| 6,233,776 B1 | 5/2001 | Blum et al. |
| 6,336,136 B1 | 1/2002 | Harris |
| 6,353,291 B1 | 3/2002 | Borgogno et al. |
| 6,387,061 B1 | 5/2002 | Nitto |
| 6,417,778 B2 | 7/2002 | Blum et al. |
| 6,538,215 B2 | 3/2003 | Montagnino et al. |
| 6,507,285 B2 | 4/2003 | Blum et al. |
| 6,609,975 B1 | 8/2003 | Sawyer |
| 6,612,670 B2 | 9/2003 | Liu |
| 6,615,526 B2 | 9/2003 | Pitcher et al. |
| 6,617,530 B1 | 9/2003 | Lin |
| 6,630,948 B1 | 10/2003 | Walker |
| 6,638,167 B1 | 10/2003 | Sawyer et al. |
| 6,639,578 B1 | 10/2003 | Comiskey et al. |
| 6,641,139 B2 | 11/2003 | Lamberti et al. |
| 6,646,545 B2 | 11/2003 | Bligh |
| 6,742,762 B2 | 6/2004 | Koyama |
| 6,753,830 B2 | 6/2004 | Gelbman |
| 6,791,575 B2 | 9/2004 | Abboud |
| 6,873,266 B2 | 3/2005 | Blum et al. |
| 6,914,540 B2 | 7/2005 | Gongolas |
| 6,917,301 B2 | 7/2005 | Blum et al. |
| 6,940,418 B2 | 9/2005 | Blum et al. |
| 6,946,310 B2 | 9/2005 | Koyama |
| 6,963,035 B2 | 11/2005 | Honda et al. |
| 6,982,649 B2 | 1/2006 | Blum et al. |
| 7,009,523 B2 | 3/2006 | Blum et al. |

| | | | | | | |
|---|---|---|---|---|---|---|
| 7,071,894 | B1 | 7/2006 | Thielemans et al. | EP | 0 365 869 | 5/1990 |
| 7,109,881 | B2 | 9/2006 | Blum et al. | EP | 0 374 860 | 6/1990 |
| 7,145,469 | B2 | 12/2006 | Kokonaski et al. | EP | 0 421 258 | 4/1991 |
| 7,205,903 | B2 | 4/2007 | Blum et al. | EP | 0 448 768 | 10/1991 |
| 2001/0011399 | A1 | 8/2001 | Blum et al. | EP | 0 512 904 | 11/1992 |
| 2001/0045893 | A1 | 11/2001 | Swartzel | EP | 0 514 191 | 11/1992 |
| 2002/0021060 | A1 | 2/2002 | Liu | EP | 0 554 641 | 8/1993 |
| 2002/0126610 | A1 | 9/2002 | Bowron | EP | 0 573 277 | 12/1993 |
| 2002/0167500 | A1 | 11/2002 | Gelbman | EP | 0 624 125 | 11/1994 |
| 2002/0186221 | A1 | 12/2002 | Bell | EP | 0 624 681 | 11/1994 |
| 2003/0013417 | A1 | 1/2003 | Bum | EP | 0 648 834 | 4/1995 |
| 2003/0045043 | A1 | 3/2003 | Koyama | EP | 0 721 176 | 7/1996 |
| 2003/0058214 | A1 | 3/2003 | Abboud | EP | 0 751 213 | 1/1997 |
| 2003/0066073 | A1 | 4/2003 | Rebh | EP | 0 794 244 | 9/1997 |
| 2003/0132924 | A1 | 7/2003 | Hamilton | EP | 0 839 900 | 5/1998 |
| 2003/0147694 | A1 | 8/2003 | Ryman et al. | EP | 0 895 745 | 2/1999 |
| 2003/0177679 | A1 | 9/2003 | Blum | EP | 0 971 064 | 1/2000 |
| 2003/0233659 | A1 | 12/2003 | Guerin | EP | 1008927 A1 | 6/2000 |
| 2004/0001002 | A1 | 1/2004 | Blum | EP | 1308120 A2 | 5/2003 |
| 2004/0021617 | A1 | 2/2004 | Blum | EP | 1562159 A1 | 8/2005 |
| 2004/0041800 | A1 | 3/2004 | Daniels | EP | 1580708 A1 | 9/2005 |
| 2004/0051644 | A1 | 3/2004 | Tamayama | FR | 2 532 095 | 2/1984 |
| 2004/0067777 | A1 | 4/2004 | Salmon | GB | 319 416 | 9/1929 |
| 2004/0119602 | A1 | 6/2004 | Blum | GB | 433 133 | 8/1935 |
| 2004/0163574 | A1 | 8/2004 | Shoenbach | GB | 1002508 | 8/1965 |
| 2004/0165015 | A1 | 8/2004 | Blum | GB | 2 182 242 | 5/1987 |
| 2004/0217876 | A1 | 11/2004 | Blum | GB | 2 263 003 | 7/1993 |
| 2004/0217952 | A1 | 11/2004 | Koyama | GB | 2386833 A | 10/2003 |
| 2004/0222026 | A1 | 11/2004 | Kohn et al. | GB | 0411142.3 | 5/2004 |
| 2004/0224777 | A1 | 11/2004 | Smith et al. | GB | 2425678 | 11/2006 |
| 2004/0239658 | A1 | 12/2004 | Koyama | JP | 61180358 A | 8/1986 |
| 2005/0057893 | A1 | 3/2005 | Homer | JP | 4-144 532 | 5/1992 |
| 2005/0085273 | A1 | 4/2005 | Khalid | JP | 05181437 A | 7/1993 |
| 2005/0105252 | A1 | 5/2005 | Tanaka | JP | 6-90891 | 4/1994 |
| 2005/0134474 | A1 | 6/2005 | Kokonaski | JP | 6-189 890 | 7/1994 |
| 2005/0176509 | A1 | 8/2005 | Hirato | JP | 6242737 A | 9/1994 |
| 2005/0195559 | A1 | 9/2005 | Lu | JP | 07008438 A | 1/1995 |
| 2005/0219240 | A1 | 10/2005 | Vesley | JP | 8-56810 | 3/1996 |
| 2005/0219694 | A1 | 10/2005 | Vesley | JP | 08-239988 | 9/1996 |
| 2005/0219695 | A1 | 10/2005 | Vesley | JP | 09006249 | 1/1997 |
| 2005/0231008 | A1 | 10/2005 | Jaaska Jr. | JP | 10-057728 | 3/1998 |
| 2005/0248566 | A1 | 11/2005 | Vesley | JP | 11-109901 | 4/1999 |
| 2005/0259094 | A1 | 11/2005 | Liu et al. | JP | 2000-105558 | 4/2000 |
| 2006/0044149 | A1 | 3/2006 | Blum | JP | 2002-00059 | 7/2000 |
| 2006/0049955 | A1 | 3/2006 | Blum | JP | 2003099155 | 4/2003 |
| 2006/0055633 | A1 | 3/2006 | Koyama | JP | 2004-099198 | 4/2004 |
| 2006/0082536 | A1 | 4/2006 | Koyama | JP | 04351679 A | 12/2004 |
| 2006/0092150 | A1 | 5/2006 | Blum | TW | 0241845 | 10/2005 |
| 2006/0188406 | A1 | 8/2006 | Frost | WO | WO 91/08701 | 6/1991 |
| 2006/0192683 | A1 | 8/2006 | Blum | WO | WO 92/09061 | 5/1992 |
| 2006/0221071 | A1 | 10/2006 | Vesley | WO | WO 93/20536 | 10/1993 |
| 2006/0227427 | A1 | 10/2006 | Dolgoff | WO | WO 95/05631 | 2/1995 |
| 2006/0250390 | A1 | 11/2006 | Vesley | WO | WO 9910057 A1 | 3/1999 |
| 2006/0262188 | A1 | 11/2006 | Elyada | WO | WO 9942186 A1 | 8/1999 |
| | | | | WO | WO 00/07811 | 2/2000 |
| | | FOREIGN PATENT DOCUMENTS | | WO | WO 00/16682 | 3/2000 |
| | | | | WO | WO 00/19871 | 4/2000 |
| CA | | 2176330 | 11/1997 | WO | WO 00/79871 | 4/2000 |
| DE | | 3147113 | 11/1981 | WO | WO 00/29209 | 5/2000 |
| DE | | 87 01 817.9 | 4/1987 | WO | WO 01/27909 | 2/2001 |
| DE | | 3 923 959 | 10/1990 | WO | WO 01/77746 | 10/2001 |
| DE | | 3 915 254 | 11/1990 | WO | WO 02/11110 | 2/2002 |
| DE | | 40 06 781 | 9/1991 | WO | WO 02/22972 | 3/2002 |
| DE | | 4135877 | 5/1993 | WO | WO 02/065451 | 8/2002 |
| DE | | 4242258 A1 | 4/1994 | WO | WO 03003729 A1 | 1/2003 |
| DE | | 298 11 821 | 10/1998 | WO | WO 03075238 A1 | 9/2003 |
| EP | | 0 009 891 | 4/1980 | WO | WO 03098345 A1 | 11/2003 |
| EP | | 0 188 005 | 7/1986 | WO | WO 03103470 A1 | 12/2003 |
| EP | | 0 199537 | 10/1986 | WO | WO 04036292 A2 | 4/2004 |
| EP | | 0 202 846 | 11/1986 | WO | WO 04049285 A1 | 6/2004 |
| EP | | 0 353 139 | 1/1990 | WO | WO 04068452 A2 | 8/2004 |
| EP | | 0 354 281 | 2/1990 | WO | WO 04075147 A1 | 9/2004 |
| EP | | 0 359 478 | 3/1990 | WO | WO 05057527 A2 | 6/2005 |

| | | |
|---|---|---|
| WO | WO 05072282 A2 | 8/2005 |
| WO | WO 06020637 A1 | 2/2006 |
| WO | WO 06034483 A1 | 3/2006 |

OTHER PUBLICATIONS

Related U.S. co-pending U.S. Appl. No. 10/454,631, filed Jun. 5, 2003.
Related U.S. co-pending U.S. Appl. No. 10/759,167, filed Jan. 20, 2004.
Related U.S. co-pending U.S. Appl. No. 11/002,276, filed Dec. 3, 2004.
Related U.S. co-pending U.S. Appl. No. 11/231,772, filed Sep. 22, 2005.
"Displaying a Winning Glow", Michael Kenward, Technology Review, Jan./Feb. 1999, vol. 102, No. 1, 7 pages.
Screen Saviors, Michael Mattis, Business 2.0, Jul. 1999, 1 page.
"What's New", "Intelligent Ink", Advertising Material, Popular, 1 page, no date.
"Electronic Ink", Glen Sanders, ebooknet.com, 2 pages, Sep. 20, 1999.
MMR Journal, "Floor Decals New Wrinkle in P-O-P Ads", vol. 16, No. 10, p. 13, Apr. 5, 1999 USA.
Philadelphia Enquirer, "Cherry Hill, N.J. Firm Wants you to Look Down on Its Ads", Regional Newspaper, Aug. 27, 1998 USA.
Patent Abstracts of Japan, vol. 1995, No. 05, Jun. 30, 1995 & JP 07 036395 A (Toray Ind Inc), Feb. 7, 1995.
Patent Abstracts of Japan, vol. 1997, No. 01, Jan. 31, 1997 & JP 08 239988 (Meitaku Syst:KK), Sep. 17, 1996.
Patent Abstracts of Japan, vol. 2002 & JP 2002 062832 A (Nippon Signal Co Ltd:THE), Feb. 28, 2002.
Patent Abstracts of Japan, vol. 1995, No. 01, Feb. 28, 1995 & JP 06 299682 A (Jiyonsuton:KK), Oct. 25, 1994.
"Floor Graphics" Advertisements, Copyright 2002.
Protective Products Advertisement, date unknown.
Sole-Parmer Advertisement, date unknown.
3m Clean-Walk Mat., 5800 Series, TechnicalData, Jul. 1995.
Advertising Materials for Alma, (Advanced Laminated Material Applications, Inc.), ClenStep Contamination Control Mat, 12 pages, 1999.
Flexible, Collaborative Organization On A Tapletop; ACM CSCW 2002: Workshop on Co-located Tabletop Collabaration: Technologies and Directions, New Orleans, Louisiana US; November 2002; available at; http://hci.stanford.edu/publications/2002/table_organization/table_organization.pdf on Oct. 4, 2007.
What is Flasma? © 2003; available at http://flasma.com/site8f63.html?pg=1 on Oct. 4, 2007.
Lumisight Table; Interactive View-Dependent Display —Table Surrounded by Multiple Users; ©2004; available at http://www.hc.ic.i.u-tokyo.ac.jp/project/Lumisight/ on Oct. 4, 2007.
Intellimat: what works in digital signage is right at your feet! © 2006; available at http://intellimat.com/index.htm on Oct. 4, 2007.
Sharing and Browsing Media on a Digital Tabletop; 2006; http://alumni.media.mit.edu/~matt/cv/tviews_ carpe_03.pdf.
Northrup Grumman; Defining the Future; Touch Table™; © 2007; located at http://www.ms.northropgrumman.com/touchtable/ on Oct. 4, 2007.
Lightspaceplay; Ultimate Interative Play System; Product Brochure; 2006; http://www.lightspacecorp.com/products/downloads/LightspacePlay.pdf.
Reactrix; Northing Works Like Brand Play; © 2007; available at http://www.reactrix.com/index.php on Oct. 4, 2007.

ELECTRONIC FLOOR DISPLAY WITH ALERTING

This application claims the benefit under 35 U.S.C. § 119(e) of U.S. provisional application Ser. No. 60/599,878, filed Aug. 10, 2004. Further, this application is a continuation-in-part of application Ser. No. 11/002,276, filed Dec. 3, 2004 and issued as U.S. Pat. No. 7,145,469 on Dec. 5, 2006, which claims the benefit under 35 U.S.C. § 119(e) of U.S. provisional application 60/526,271, filed Dec. 3, 2003. Application Ser. No. 11/002,276 is a continuation-in-part of application Ser. No. 10/454,631, filed Jun. 5, 2003, and issued as U.S. Pat. No. 7,009,523 on Mar. 7, 2006, which claims the benefit under 35 U.S.C. § 119(e) of U.S. provisional application 60/385,579 filed Jun. 5, 2002. Application Ser. No. 10/454,631 is a continuation-in-part of application Ser. No. 10/438,923, filed May 16, 2003, and issued as U.S. Pat. No. 6,982,649 on Jan. 3, 2006, which claims the benefit under 35 U.S.C. § 119(e) of U.S. provisional application 60/378,070, filed May 16, 2002. Application Ser. No. 10/438,923 is a continuation-in-part of application Ser. No. 10/285,639, filed Nov. 1, 2002 now U.S. Pat. No. 6,873,266 on Mar. 29, 2005 which is a continuation of application Ser. No. 10/137,357, filed May 3, 2002, and issued as U.S. Pat. No. 6,507,285 on Jan. 14, 2003. Application Ser. No. 10/137,357 is a continuation of application Ser. No. 09/767,846, filed Jan. 24, 2001, and issued as U.S. Pat. No. 6,417,778 on Jul. 9, 2002. Application Ser. No. 09/767,846 is a continuation of application Ser. No. 09/418,752, filed Oct. 15, 1999, and now abandoned. Application Ser. No. 09/418,752 is a continuation-in-part of application Ser. No. 09/304,051, filed May 4, 1999, and issued as U.S. Pat. No. 6,219,876 on Apr. 24, 2001. Moreover, this application is a continuation-in-part of application Ser. No. 10/759,167, filed Jan. 20, 2004 now U.S. Pat.No. 7,205,900 in Apr. 17, 2007, which claims the benefit under 35 U.S.C. § 119(e) of U.S. provisional application Ser. No. 60/441,408, filed Jan. 22, 2003. Application Ser. No. 10/759,167 is a continuation-in-part of application Ser. No. 10/682,435, filed Oct. 10, 2003, and issued as U.S. Pat. No. 6,917,301 on Jul. 12, 2005, which claims the benefit under 35 U.S.C. § 119(e) of U.S. provisional applications identified as follows: application Ser. No. 60/418,626, filed Oct. 12, 2002; application Ser. No. 60/428,387, filed Nov. 21, 2002; and application Ser. No. 60/429,044, filed Nov. 23, 2002. Application Ser. No. 10/682,435 is a continuation-in-part of co-pending application Ser. No. 10/438,923, filed May 16, 2003. Each of the above-identified applications and patents is incorporated herein in its entirety by reference.

BACKGROUND

U.S. Pat. No. 6,417,778 to Blum et al., which is fully incorporated herein by reference, describes an electronic display device associated with a floor, that enables conveying information via dynamic images and text. The present disclosure relates to various novel and advantageous features of such an electronic display device.

For example, the electronic display device may be included in an overall floor display system including a protective housing for the display device, control electronics, sensors and other components. To avoid creating a trip hazard, the floor display system may be designed to present a minimum of impediment to persons walking. Thus, the floor display system may be very thin, be substantially coplanar with a floor or imbedded in a floor, or the like, making the floor display system very easy to walk across or step onto.

Market research suggests that because of its nearly imperceptible profile, in terms of how it affects a person's normal stride, persons (e.g. shoppers in a store) will sometimes be unaware of a floor display system having the above-described design, even while actually standing near or directly on the floor display system. Accordingly, there is a need to alert a person to the presence of the floor display system when he or she is standing near or on it, so that the person will look down and take in the content of a display, such as a message or advertisement.

DETAILED DESCRIPTION

Embodiments of the present invention relate to a floor display system comprising an electronic display device, a housing for the electronic display device, and an alerting device to generate an alert in response to the detecting of a person. The person may be in the proximity of the floor display system. For example, the person may be near or standing on the housing. The alert may be any kind of stimulus to get the attention of the person. For example, the alert may include a vibration, a light, a sound, or any combination of these. The detecting may be based on any kind of physical effect associated with a person near or standing on the housing. For example, the effect could include a pressure being applied by a standing person's weight on the housing for a predetermined period of time. As another example, the effect could include a change in the intensity of light on the housing a predetermined period of time, due to a person near or standing on the housing and thus blocking ambient or incipient light.

Figure 1:
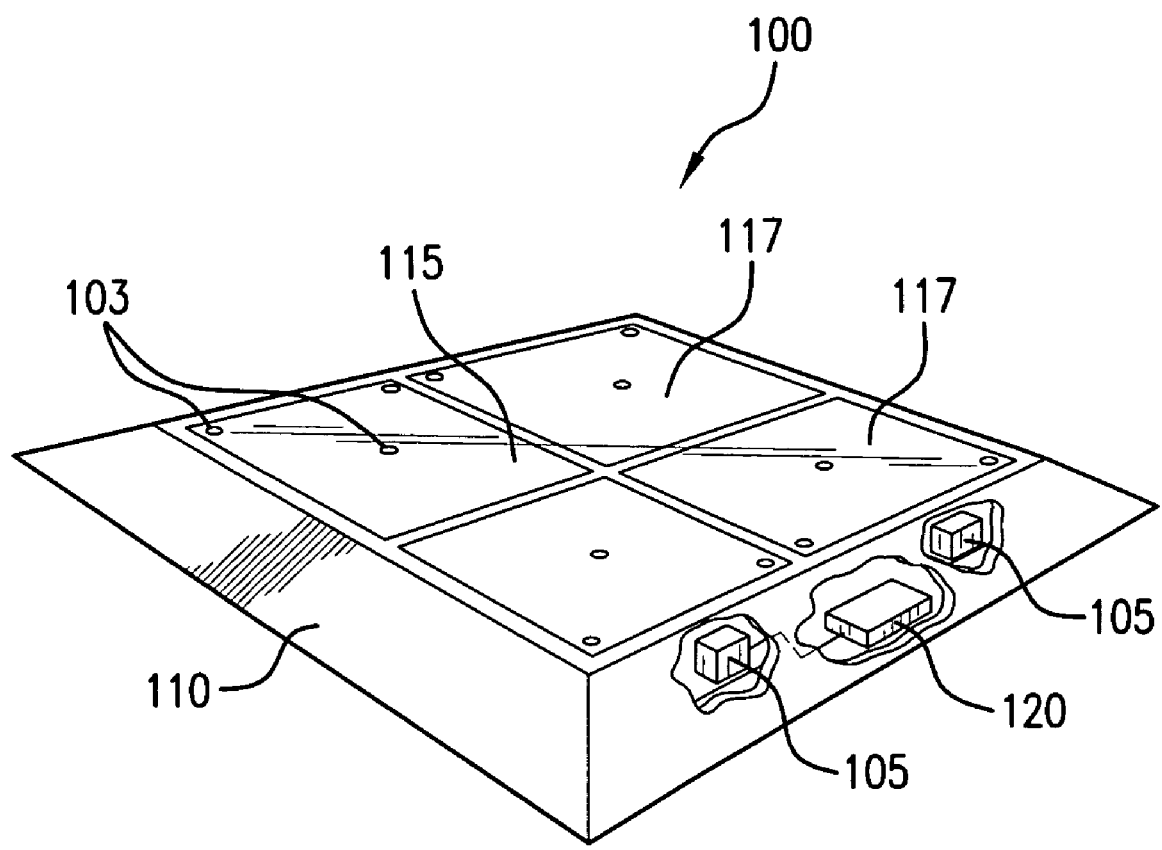
FIGS. 1 and 2 show a plan view of a floor display system according to embodiments of the present invention.

FIG. 1 shows a floor display system 100 according to embodiments of the present invention. The system 100 may include a housing that comprises a transparent or translucent protective cover 115 bordered by an outer shell 110. The outer shell 110 may comprise sloping surfaces tapering to a thin edge. The housing may be capable of being walked over, where the sloping surfaces and thin edge act to reduce the likelihood of a person tripping over the display system. Further, the housing may be stood upon. The housing may enclose one or more electronic display devices 117 and protect it/them from damage.

A plurality of sensing devices 103 may be arranged on or in the housing to sense effects associated with a person near or standing on the housing. For example, the sensing devices 103 may include pressure sensing devices to sense a person's weight. Additionally or alternatively, the sensing devices 103 may include light-responsive devices or temperature-sensing devices. The light-responsive devices could detect a reduction in the intensity of light striking the protective covering 115, due to a person's body blocking light due to being near or standing on the housing. In embodiments, the light-responsive devices could be passive devices that receive light energy from ambient light and register changes in the amount of light energy received. In other embodiments, the light-responsive devices could be active sensing devices, such as lasers, that emit electromagnetic energy such as light or other radiation, and generate signals based on whether the emitted light energy is reflected or interrupted. Embodiments could include both passive and active devices.

As noted above, pressure-sensing devices or temperature-sensing devices could also be used to detect a person standing on the housing. The pressure-sensing devices, temperature-sensing devices and light-responsive devices could each be used solely or in combination with each other or with other types of sensing devices.

The sensing devices 103 may be arranged anywhere on or in or near the housing. For example, they could be arranged below the transparent/translucent protective cover 115 and/or bordering outer shell 110. Additionally or alternatively, they could be on an upper surface of the protective cover 115 and/or bordering outer shell 110 or embedded within the protective cover 115 and/or bordering outer shell 110. For example, the protective cover 115 and/or bordering outer shell 110 could be machined or fabricated to receive a sensing device array therein in such a way that the sensing device array is protected but can sense changes in light and/or pressure and/or temperature. A passive or active light-responsive device, for example, could be arranged proximately to the housing but not necessarily on or in the housing.

The floor display system 100 may further comprise a controller 120. The controller 120 may be coupled to the sensing devices 103. The controller 120 may include any kind of electronic logic circuit, for example, a general microprocessor configurable with software, or an ASIC (application specific integrated circuit). The controller may be programmed with logic to make a decision about whether a person is near or standing on the housing of the floor display system 100. This operation may be advantageous because persons may simply walk by or across the floor display system and not pause for any significant period of time near or on the housing. Such behavior may not serve to determine whether or not a person has noticed a display on the system. On the other hand, standing on the housing for a predetermined period of time may suggest that the standing person has not noticed the display, because if he or she had noticed the display, he or she would likely have moved so as not to obscure his or her view of the display.

Consequently, the controller 120 may be configured to receive inputs from the sensing devices 103 and execute logic to decide, based on the inputs, whether a person is standing near or on the housing of the floor display system 100. The logic could include any kind of calculation or algorithm, but could be based at least partly on a measurement of a physical effect associated with a person standing near or on the housing, registered by a sensing device 103 and input to the controller 120. For example, if a certain measure of pressure lasting for a predetermined period of time was registered by a sensing device, this could be interpreted by the controller 120 as an indication of a person standing on the housing. The controller 120 or a data storage medium associated therewith, for example, could store data tables containing predetermined values or ranges of values for amounts of pressure, and corresponding predetermined values for time thresholds. By, for example, comparing measured values input from a sensing device with these predetermined values, the controller could decide whether a person was standing on the housing.

Similarly, a change in the intensity of ambient or incipient light over a period of time could be measured by a sensing device, and this measurement could be input to the controller. The controller could compare the measured values with predetermined values and time thresholds to decide whether a person was standing near or on the housing. To register a change in light intensity, for example, a baseline level of light energy could be determined based on an average of light energy received by a plurality of sensing devices, and measured light intensity could be compared with this baseline value.

Similar determinations could be made by measuring changes in temperature, or any other physical effects. The controller's determination could be based on a combination of inputs from sensing devices measuring a plurality of different kinds of physical effects, including pressure, light, temperature or others.

FIG. 1 further shows a plurality of alerting devices 105. The controller 120 may further be coupled to the alerting devices. The alerting devices 105 could be activated by the controller 120 to generate an alert if the controller 120 determined that a person was standing near or on the housing of the floor display system 100. The alerting devices could include, for example, electromechanical actuators to generate a vibration. The vibration could be felt by the standing person and cause him or her to look down at the display. The actuators may be, for example, piezoelectric actuators.

Figure 2:
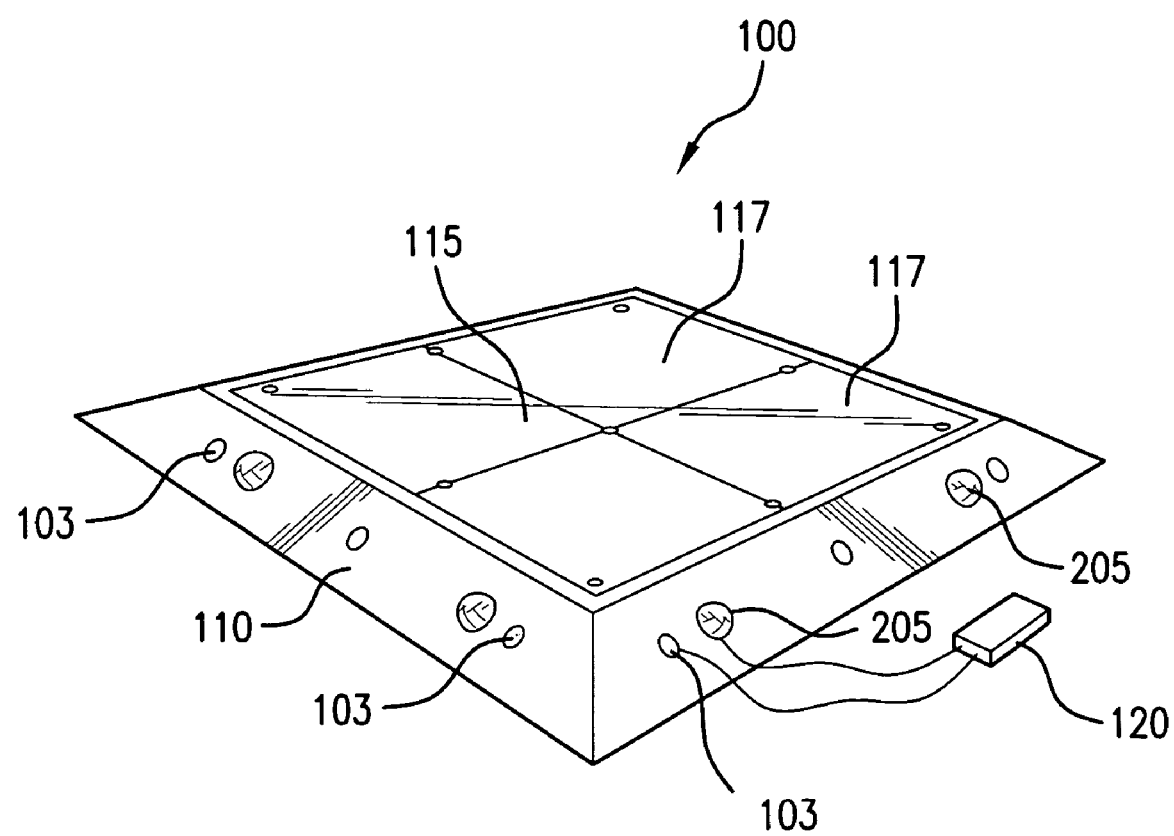

FIG. 2 shows an embodiment of a floor display system 100 with alerting devices 205 representing devices to generate some form of visual stimulus, such as flashing or strobing lights. An alerting device to generate a visual stimulus could include a light-emitting diode, for example. The alerting devices 205 may be arranged in or on the outer shell bordering the protective cover, but are not limited to this placement. The alerting devices 205 may also be considered as representing sound-generating devices to generate an aural stimulus such as a musical jingle. As shown in FIG. 2, the controller 120 may be coupled to both a sensing device 103 and an alerting device 205. Based on input from the sensing device 103 the controller 120 may activate the alerting device 205. Alerting devices generally according to embodiments of the present invention could include any combination of devices to generate vibratory, visual, aural or other stimuli. These stimuli may have the effect of causing a person standing near or on the housing of the floor display system 100 to look down at a display being generated by the floor display system. Alerts generated by the alerting devices may be periodic, continuous, or variable in intensity or duration.

As noted above, an electronic display device associated with a floor has been previously disclosed. More specifically, U.S. Pat. No. 6,417,778 discloses a system for electronically conveying information via an electronic display device associated with a floor. The electronic display device may incorporate a modifiable electronic display surface presenting for example, a liquid crystal display. The display could be connected to a computer and a computer generated image could be displayed on the display. Thus, the image displayed on the display could be modified by generating a different computer image and displaying that computer image on the display. The display could be associated with a base portion of a floor covering, such as included within a recess thereof, or could be included on a bottom surface, facing upward, of an insert portion of the floor covering. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or in combination.

Other alternatives for modifying graphics displayed on the floor covering include using light emitting polymers to create, and thus change, the graphics. The light emitting polymers can be either applied to, attached to, or woven into the floor covering. The light emitting polymers may be utilized on any portion of floor covering, for example, on either the base portion or the insert portion, or on any other portion of the different embodiments for the floor covering. Light emitting polymers are known and described in U.S. Pat. Nos. 5,945,502, 5,869,350, and 5,571,626, which are incorporated herein by reference in their entirety.

Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer and thus, the World Wide Web by utilizing, for example, a Motorola paging system. Text on all displays, if multiple displays are used, can be changed at once by a single editor, through a Web page.

Display technologies that may be utilized in embodiments of the present invention, in addition to those described above, include: light-emitting diodes (LEDs), organic light-emitting diodes (OLEDs), electroluminescent (EL) displays, plasma display panels (PDPs), field emission displays, ferroelectric displays (FEDs), light-emitting polymers, pixels, micro-encapsulated components, and optical fiber displays.

A floor display system as disclosed above may be used in places where there is foot traffic or other (for example, wheeled shopping cart) traffic, such as entryways to stores, public buildings or homes. In such environments, strong forces may be imparted to the floor display system by the foot traffic or other traffic. Techniques for suitably protecting the electronic display device from damage due to such forces and other factors have been disclosed. The techniques include using a tough, durable protective material such as tempered glass or plastic to cover the electronic display device. More sophisticated protective structures have also been disclosed. For example, U.S. patent application Ser. No. 10/454,631, which is fully incorporated herein by reference, describes a modular protective structure for an electronic display device associated with a floor.

As described in Ser. No. 10/454,631, an electronic display assembly may comprise a plurality of display modules. A coherent display may be presented on the plurality of display modules. That is, while individual display modules may present only fragments of a display, in the aggregate the plurality of display modules may present a complete or unified display. On the other hand, each of the modules could be configured to display unrelated images and/or text.

More specifically, a display module may be an electronic display device incorporating any display technology, including those disclosed herein, and others not specifically disclosed. A display module may be configured to electronically display graphical images and alphanumeric data in either a static (not moving or changing) or dynamic (e.g., scrolling or otherwise moving or changing) format. More specifically, a display module may be coupled by wired or wireless means to a controller and modifiable via the controller to display any content chosen by a user. For example, a display module may be coupled to the controller via a display driver circuit such as a video graphics adapter card. The controller may include any kind of electronic logic circuit, for example, a general microprocessor configurable with software, or an ASIC (application specific integrated circuit). A driver of a display module may be integrated with the controller or built into an ASIC. The controller may also be in the form of a single board computer with a processor and memory and with one or more display driving circuits built onto the board, as well as wireless components for communicating with the outside world or for loading data into memory. The controller may be coupled to a storage medium, which could be any form of medium suitable for short or long tem storage of digital data, including RAM (random access memory), ROM (read-only memory), flash or other non-volatile solid-state electronic storage, EEPROM (electronically erasable and programmable read only memory), or magnetic and/or optical disk storage. The storage medium may store, for example, control software for execution by the controller and video content of choice for display, under the control of the control software, by a display module.

As illustrated in FIG. 1, the controller 120 may be laterally arranged with respect to (i.e., to one or more sides of) the display modules. The display modules and the controller may be disposed so as to lie in substantially the same plane, and may both be thin and flat.

Embodiments of the present invention may further include any of the features or properties of the applications incorporated herein by reference. For example, embodiments of the present invention may include or be associated with an audio device, a sensing device for sensing the presence of persons (apart from persons standing near or directly on the display housing, such as a motion sensing device) and performing an action in response, variable image orientation, and interactive features including providing product information in response to customer queries. Embodiments of the present invention may further be capable of wired or wireless communication with a network.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A floor display system comprising:
an electronic display device capable of displaying electronically modifiable verbal information and electronically modifiable pictorial information, and having a protective cover capable of being walked over or stood upon; and
an alerting device to generate an alert in response to the detecting of a person.

2. The floor display system of claim 1, further comprising:
a housing for the electronic display device;
wherein the alerting device is configured to generate an alert in response to the detecting of a person standing on or proximate the housing.

3. The floor display system of claim 2, wherein the detecting is based on a pressure on the housing for a predetermined period of time.

4. The floor display system of claim 2, wherein the detecting is based on a change in light intensity on or proximate the housing for a predetermined period of time.

5. The floor display system of claim 2, further comprising at least one sensing device to register a physical effect associated with a person standing on or proximate the housing.

6. The floor display system of claim 5, wherein the sensing device senses pressure.

7. The floor display system of claim 5, wherein the sensing device senses light.

8. The floor display system of claim 2, further comprising a controller to determine whether a person is standing on or proximate the housing based on input from the sensing device.

9. The floor display system of claim 2, wherein the alerting device comprises an actuator to generate vibration.

10. The floor display system of claim 9, wherein the actuator includes a piezoelectric actuator.

11. The floor display system of claim 1, wherein the alert comprises a vibration.

12. The floor display system of claim 1, wherein the alert comprises a light.

13. The floor display system of claim 1, wherein the alert comprises a sound.

14. The floor display system of claim 1, wherein the alert is periodic.

15. The floor display system of claim 1, wherein the alert is continuous.

16. The floor display system of claim 1, wherein the alert is variable in intensity.

17. The floor display system of claim 1, wherein a duration of the alert is variable.

18. The floor display system of claim 1, wherein the alerting device generates a visual stimulus.

19. The floor display system of claim 18, wherein the alerting device includes a light-emitting diode.

20. The floor display system of claim 18, wherein the alerting device generates a strobe signal.

21. The floor display system of claim 1, wherein the alerting device generates an aural stimulus.

22. The floor display system of claim 1, wherein the electronic display device includes at least one of a liquid crystal display, electric paper, electronic ink, a light-emitting polymer, an organic light-emitting diode, a micro-encapsulated component, light-emitting diode, electroluminescent display, plasma display panel, field emission display, ferroelectric displays, optical fiber display, and a pixel.

23. A floor display system comprising:
an electronic display device capable of displaying electronically modifiable pictorial information, and having a protective cover capable of being walked over or stood upon; and
an alerting device to generate an alert in response to the detecting of a person.

* * * * *